Jan. 20, 1925.  1,523,907
J. E. SERSTÉ
FOLDING CANOPY FOR VEHICLE BODIES
Original Filed March 21, 1922
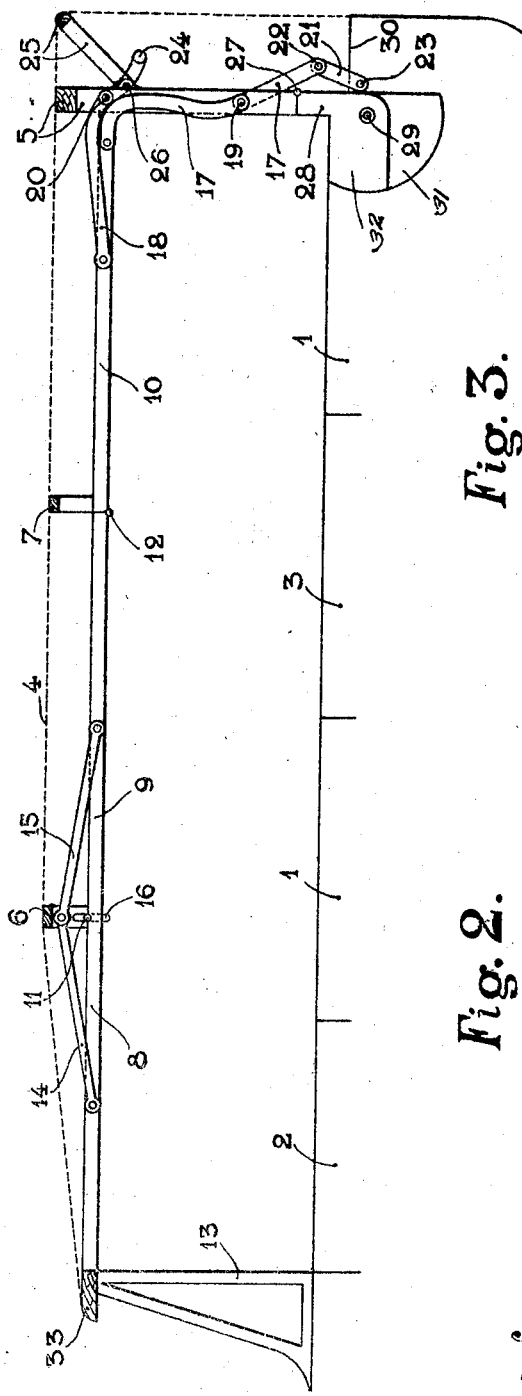
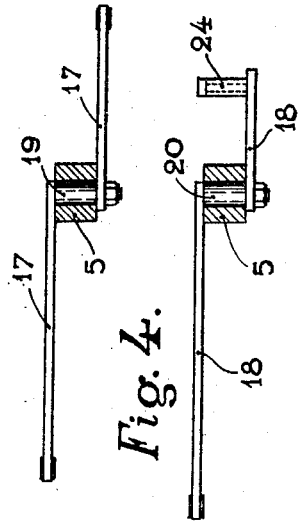
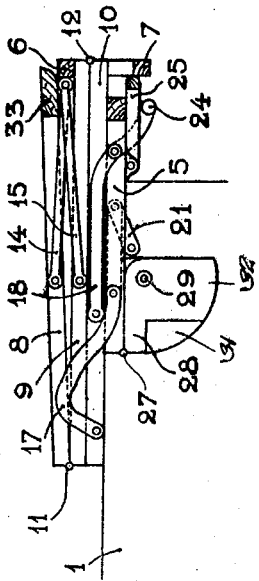
Inventor
Jacques Egide Sersté
per Howalus
Attorney.

Patented Jan. 20, 1925.

1,523,907

UNITED STATES PATENT OFFICE.

JACQUES EGIDE SERSTÉ, OF LAEKEN-BRUSSELS, BELGIUM.

FOLDING CANOPY FOR VEHICLE BODIES.

Original application filed March 21, 1922, Serial No. 545,554. Divided and this application filed February 7, 1923. Serial No. 617,604.

*To all whom it may concern:*

Be it known that JACQUES EGIDE SERSTÉ, subject of the King of the Belgians, residing at No. 83 Rue de Wautier, Laeken-Brussels, Belgium, has invented certain new and useful Improvements in Folding Canopies for Vehicle Bodies, of which the following is a specification.

The present invention has reference to a folding canopy or hood structure for all-weather vehicle bodies, and more particularly for vehicle bodies of the kind disclosed in my co-pending patent application Ser. No. 545,554, dated March 21st, 1922, of which the present application is a division.

It is the object of my present invention so to construct the folding frame of the canopy as to materially reduce the size of the projection formed rearwardly of the vehicle by the folded canopy. It is particularly desirable to reduce such projection in vehicle bodies according to my co-pending application aforesaid, in which the window frames extend rearwardly of the rear doors, the pivotal connection between the vehicle body and the folding frame then being located near the rear edge of the body, so that the rear portion of the body does not afford a proper support for the canopy when folded.

In accordance with my present invention I overcome this difficulty by pivoting the main hoop of the canopy to a pair of supporting members which in turn are pivoted to the vehicle body, and I provide between the main hoop and the vehicle body an additional connection whereby the hinged supporting members are constrained to carry forward the pivot on which the main hoop is caused to swing when the canopy is being folded. It follows that, while the canopy is being folded, the pivot on which it swings is automatically brought forward a distance corresponding to the length of the supporting members so that the portion of the folded canopy that comes to rest on the vehicle body is increased by twice that length, while the length of the unsupported projecting portion is reduced accordingly.

In the accompanying drawing which shows by way of example an embodiment of this invention:

Figs. 1 and 2 are side elevations respectively showing the canopy opened out and folded up.

Figs. 3 and 4 are detail views on a larger scale.

Referring to Fig. 1, I have shown at 1 a motor car body having doors 2 and 3 and adapted to be fitted with window frames comprising each four hinged panels. The canopy, the flexible cover of which is indicated on Fig. 1 by the dotted line 4, comprises as usual a main hoop 5, a suitable number of smaller hoops 6, 7 and two longitudinal side members composed each of a plurality of bars or sections 8, 9, 10 hinged to each other as at 11 and 12. In front the bars or sections 8 are interconnected by a cross-piece 33 adapted to be secured in a known manner to the frame 13 of the windshield when the canopy is extended.

The front hoop 6 is connected on each side to the sections 8 and 9 by means of pivoted rods 14, 15 which form hinged parallelograms with the said sections. In the extended position (Fig. 1), the hoop 6 rests on the joints 11 which may be locked against breaking by suitable clamps 16. The second hoop 7 is rigidly secured to the sections 10. To each section 10 are pivoted two arms 17, 18 each of which is pivoted at an intermediate point of its length to the main hoop 5. The arms 17 and 18 and their pivotal connections 19, 20 to the main hoop 5 are shown on an enlarged scale in Figs. 3 and 4 respectively.

The arm 17 is pivoted at 22 to a short link 21 which in turn is pivoted at 23 to the rear of the vehicle body 1, the arm 17 and link 21 forming a toggle which can only be broken by a rearward movement of the pivot 22. The free end of the arm 18 is provided with a laterally extending pin 24 which, when the canopy is being folded, catches and applies against the main hoop 5 a small auxiliary hoop 25 pivoted to the main hoop at 26. The lower ends of the main hoop 5 are pivoted at 27 to two supporting members 28 pivoted each to an axis 29 mounted in a vertical slot 31 in one of the side walls of the vehicle body. As shown in Fig. 1 the rear portion of each side wall acts as a stop to prevent the members 28 swinging rearwardly. Said members 28 are preferably provided with forwardly extending projections 32 adapted to close the openings of the slots 31 when the members 28 are in an upright position.

To close up the canopy the clamps 16 are first removed then the sections 8 are raised and pushed towards the back of the carriage. As a result of this movement the joints 11 are first caused to break, the sections 8 and 9 closing up on each other and embracing the hoop 6 which is pushed outwardly by the rods 14 and 15. The joints 12 then breaking, the sections 8 and 9, with the hoop 6 between them, will fold up against the sections 10 which, in turn, will be guided by the arms 17, 18 so that they come to lie against the main hoop 5 while the latter is swung back about the pivot 27. Meanwhile the rearward bending of the toggle 17, 21 has forced the pivot 27 to move forward to the position shown in Fig. 2. In the course of the downward movement of the main hoop 5, the small hoop 25 has been caught by the pin 24 and applied against the hoop 5.

It will be seen from Fig. 2 that the forward movement of the pivot 27 results in reducing by a length equal to twice the distance between the pivots 27 and 29 the projection formed at the rear of the car by the folded up canopy, and in correspondingly increasing the portion thereof lying on the car body. This projection may also advantageously be reduced in height by terminating the rear wall of the body at a level 30 below the edge of the side walls of the body. In the structure shown the height of the projection above the body is thus reduced by a length equal to the thickness of the main hoop 5.

I claim:

1. In combination with a vehicle body, a folding canopy comprising a main hoop, a pair of supporting members pivoted each to said body and to one end of said hoop, said supporting members being each mounted in a slot in a side wall of said body, the rear walls of said slots forming each a stop for preventing one of said supporting members from swinging rearwardly, forwardly extending projections on said supporting members adapted to close the openings of said slots, and links pivoted to said hoop and to said body respectively, said links forming a toggle whereby said supporting members are forced to swing forwardly when said hoop is swung rearwardly.

2. In combination with the side walls of a vehicle body, a folding canopy comprising a main hoop, a pair of co-axial horizontal pivots extending across vertical slots in said side walls, a pair of supporting members in said slots adapted to swing about said pivots and pivotally connected to the ends of said hoop, forwardly extending projections on said supporting members adapted to close the openings of said slots, and a pair of toggles comprising each two links pivoted respectively to one side of said hoop and to a side wall of said body, said side walls being cut away rearwardly of said supporting members to accommodate said hoop.

3. In combination with a vehicle body, a folding canopy comprising a main hoop, a pair of supporting members pivoted each to said body and to one end of said hoop, longitudinal side members composed of a plurality of hinged sections, an auxiliary hoop pivoted to the sides of said main hoop, two arms pivoted at an intermediate point of their length to one side of said main hoop, both said arms being pivoted at one end to one section of one of said side members, a link pivoted to the other end of one said side arms and to said vehicle body, and a pin on the free end of the other of said arms adapted to apply said auxiliary hoop against said main hoop when the canopy is being folded.

JACQUES EGIDE SERSTÉ.